(12) United States Patent
Stadelmaier

(10) Patent No.: US 8,689,731 B2
(45) Date of Patent: Apr. 8, 2014

(54) APPARATUS AND PROCESS FOR COATING A COMPONENT WITH ALIGNING DEVICE

(75) Inventor: Falk Stadelmaier, Baden (CH)

(73) Assignee: Siemens Aktiengesellschaft, München (DE)

( * ) Notice: Subject to any disclaimer, the term of this patent is extended or adjusted under 35 U.S.C. 154(b) by 1492 days.

(21) Appl. No.: 12/077,613

(22) Filed: Mar. 20, 2008

(65) Prior Publication Data

US 2008/0286443 A1 Nov. 20, 2008

(51) Int. Cl.
*B05C 11/00* (2006.01)
*C23C 14/54* (2006.01)

(52) U.S. Cl.
USPC ............................ 118/665; 118/663; 427/9

(58) Field of Classification Search
USPC .................................. 118/302, 664; 427/9
See application file for complete search history.

(56) References Cited

U.S. PATENT DOCUMENTS

| | | | | |
|---|---|---|---|---|
| 3,454,414 | A | * 7/1969 | Andes | 365/127 |
| 4,358,471 | A | * 11/1982 | Derkacs et al. | 427/9 |
| 5,047,612 | A | * 9/1991 | Savkar et al. | 219/121.47 |
| 6,024,792 | A | 2/2000 | Kurz et al. | |
| 2006/0144331 | A1* | 7/2006 | Hanafusa et al. | 118/712 |
| 2010/0006029 | A1* | 1/2010 | Jung et al. | 118/712 |

FOREIGN PATENT DOCUMENTS

| | | |
|---|---|---|
| EP | 0 542 542 | 5/1993 |
| EP | 0 486 489 | 11/1994 |
| EP | 0 412 397 | 3/1998 |
| EP | 0 892 090 | 1/1999 |
| EP | 0 786 017 | 3/1999 |
| EP | 1 306 454 | 5/2003 |
| EP | 1 319 729 | 6/2003 |
| EP | 1 204 776 | 6/2004 |
| EP | 1 332 799 | 3/2006 |
| WO | WO 99/67435 | 12/1999 |
| WO | WO 00/44949 | 8/2000 |

* cited by examiner

*Primary Examiner* — Dah-Wei Yuan
*Assistant Examiner* — Karl Kurple

(57) ABSTRACT

Disclosed is an apparatus and process for coating a component with aligning device. Alignments or checking of the spray cone take place within the coating apparatus via an optically transparent reference plate which is optically evaluated.

5 Claims, 4 Drawing Sheets

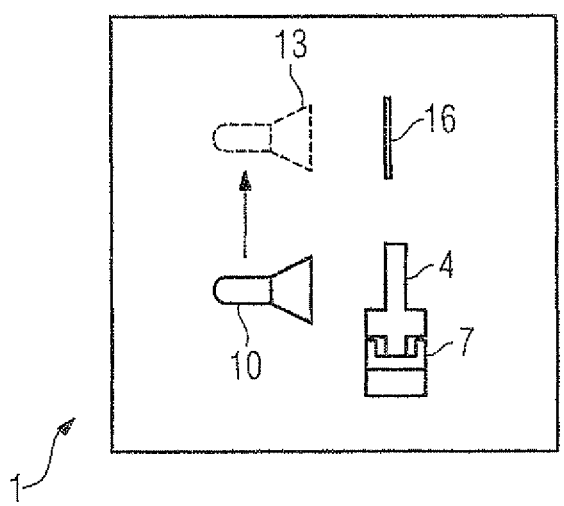
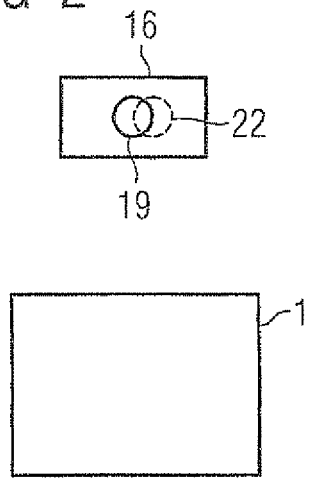
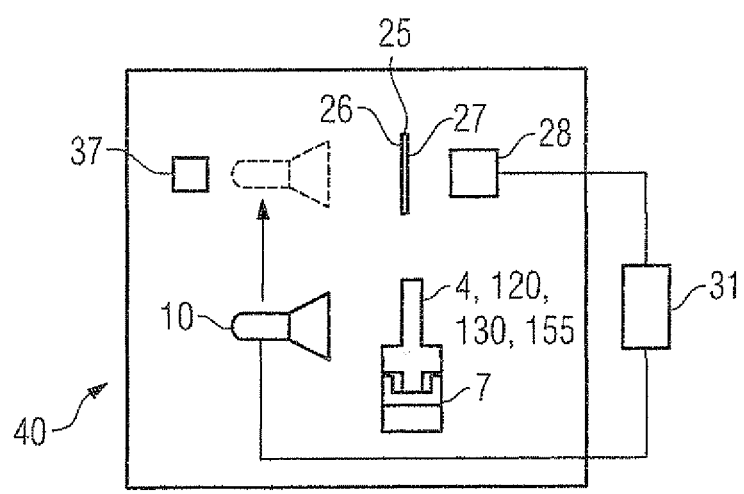

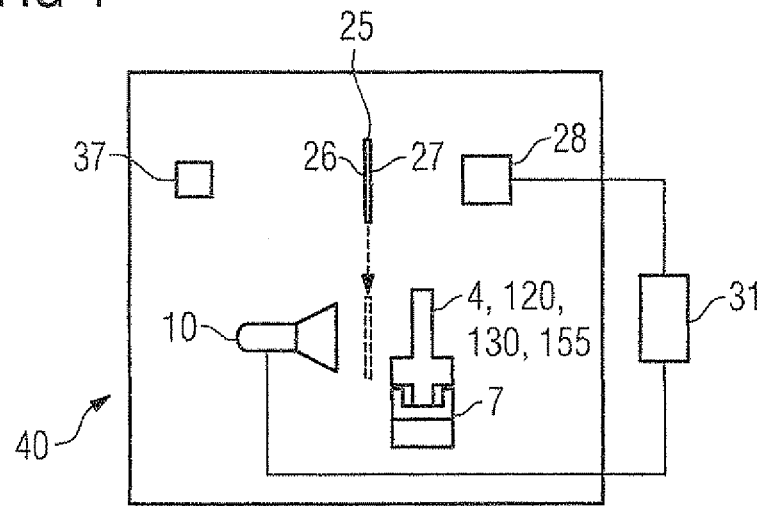
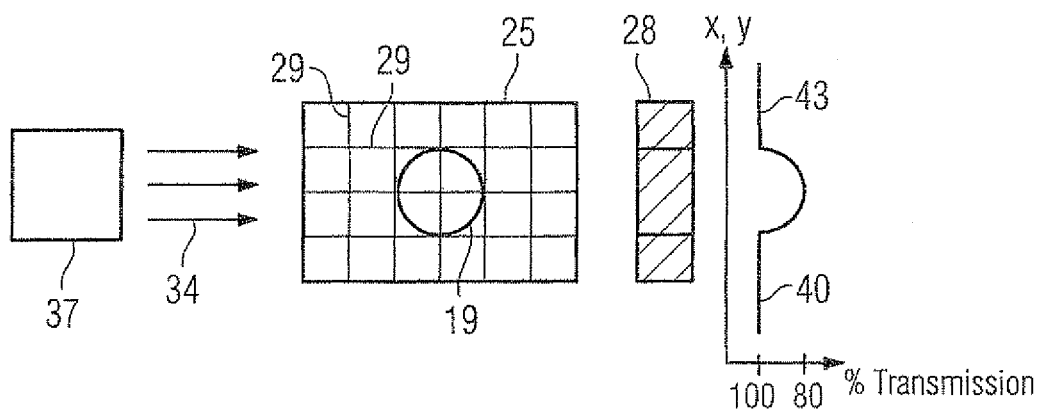

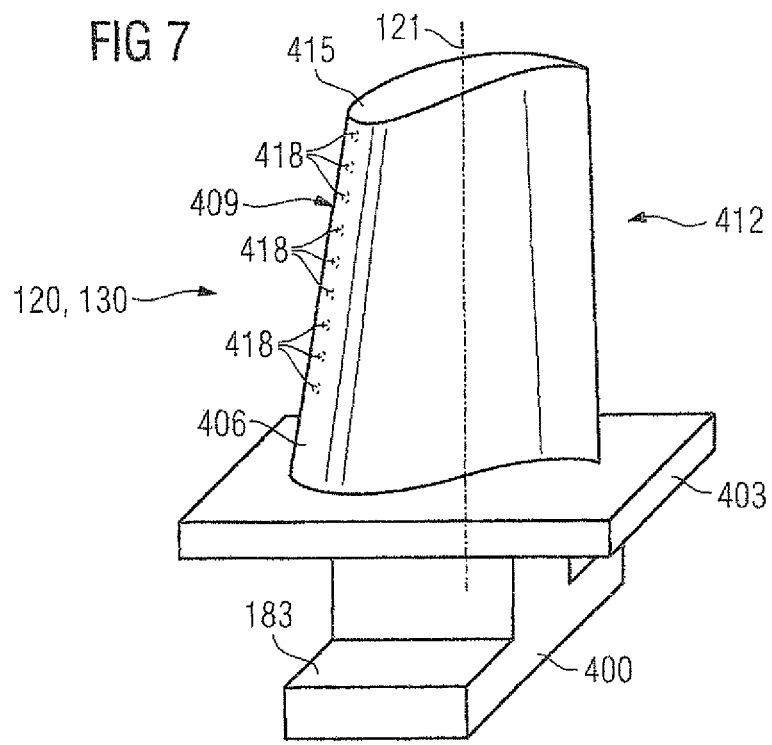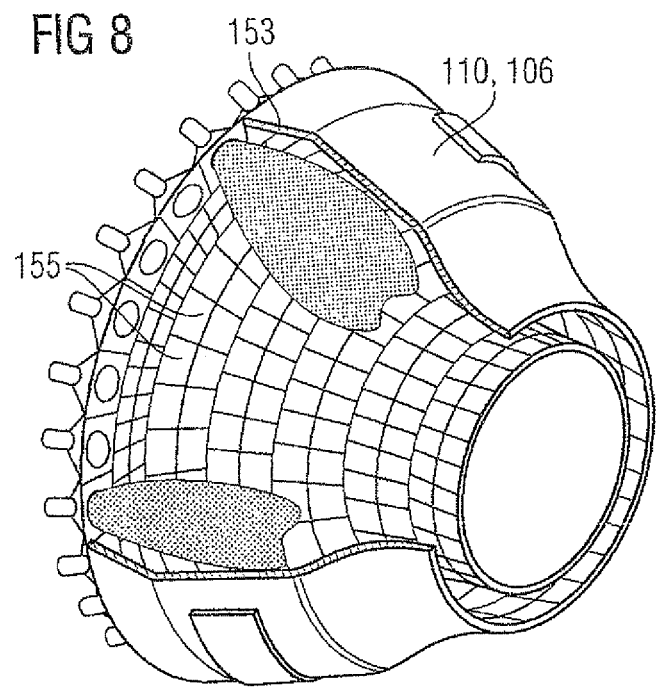

APPARATUS AND PROCESS FOR COATING A COMPONENT WITH ALIGNING DEVICE

CROSS REFERENCE TO RELATED APPLICATIONS

This application claims the benefits of European application No. 07006095.9 filed Mar. 23, 2007 and is incorporated by reference herein in its entirety.

FIELD OF INVENTION

The invention relates to an apparatus and a process for coating a component, in which the position of coating material sources and/or the component to be coated can be aligned.

BACKGROUND OF THE INVENTION

During plasma spray or HVOF coating, a spray cone, i.e. the distribution of the material, is checked in order to check the alignment of nozzles. This is done by means of a steel plate which is coated and has to be removed from the coating installation and inspected. This entails an interruption to the coating process and means that the assessment of the alignment is of poor quality.

SUMMARY OF INVENTION

It is therefore an object of the invention to provide an apparatus and a process which overcome the problem of the prior art.

The object is achieved by the apparatus and the process as claimed in the claims.

The subclaims list further advantageous measures, which can be combined with one another in any desired way in order to bring about further advantages.

BRIEF DESCRIPTION OF THE DRAWINGS

In the drawing:

FIGS. 1, 2 show an apparatus and a process according to the prior art,

FIGS. 3, 4, 5 show an apparatus according to the invention for carrying out the process according to the invention, FIG. 7 shows a perspective view of a turbine blade or vane, FIG. 8 shows a perspective view of a combustion chamber.

DETAILED DESCRIPTION OF INVENTION

Figure 6:
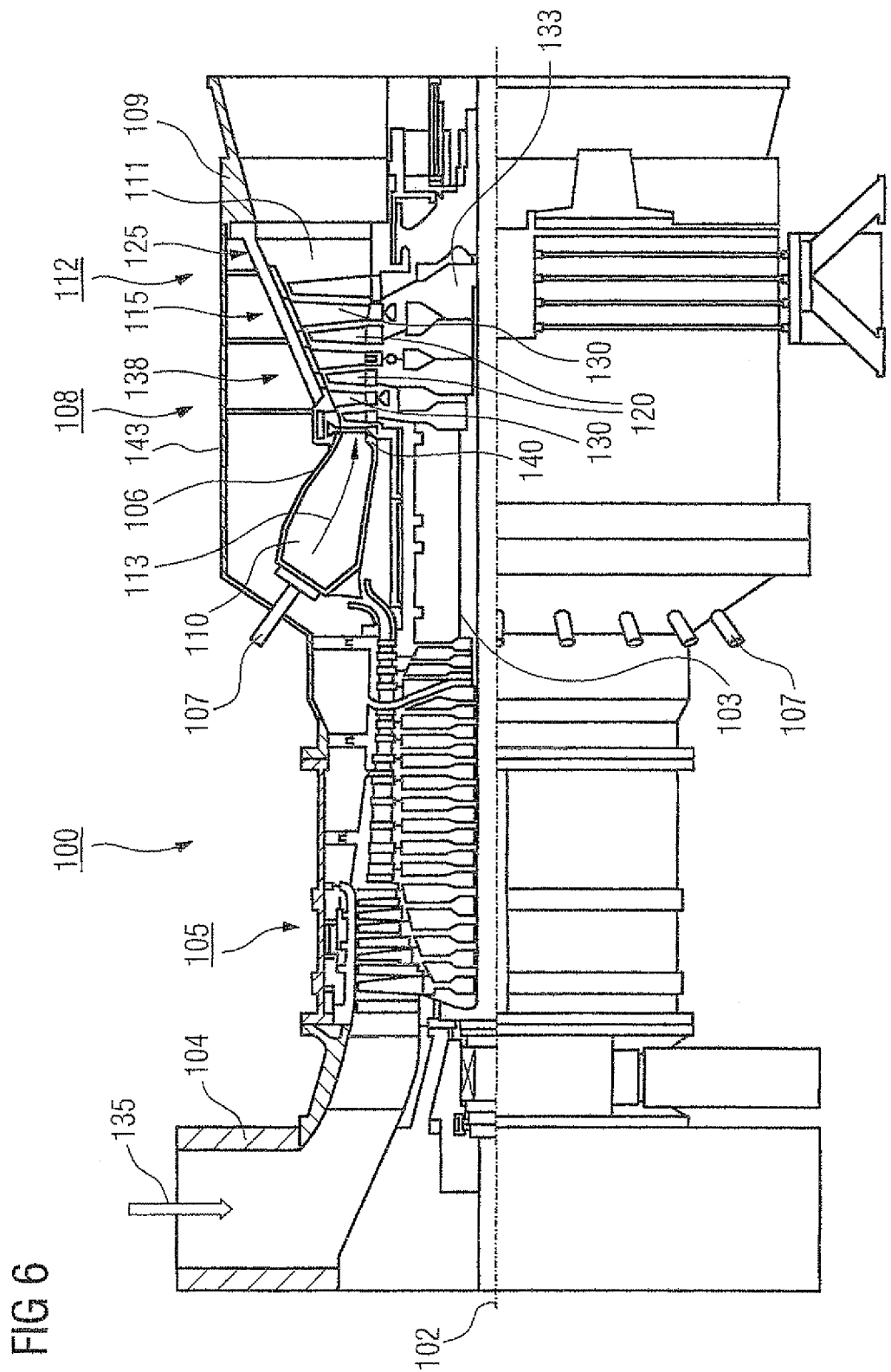
FIG. 6 shows a gas turbine.

FIG. 1 shows a coating installation 1 according to the prior art, in which a component 4 that is to be coated is present in a holder 7.

The component 4, 120, 130, 155 (FIG. 6, 7, 8) is coated by means of a coating material source 10, for example by means of a plasma nozzle (LPPS, APS, VPS, etc.), a nozzle of an HVOF coating installation or from a nozzle of a cold-spraying installation or another material source (for example a PVD or CVD material source).

To carry out checking by means of a spray cone, the coating material source 10 is moved into a position 13 indicated by dashed lines in FIG. 1. Coating material is applied to a reference plate 16, which is removed from the coating installation 1 and can only be examined outside the coating installation 1.

This is illustrated in FIG. 2, in which the coated reference plate 16 is present outside the coating installation 1.

A coated surface 19, for example a spray cone 19, which may have deviations from a desired geometry 22 (indicated by dashed lines) of the spray cone, is present on the reference plate 16. In the event of deviations, by way of example the coating material source 10 may have to be realigned or replaced.

FIG. 3 shows an apparatus 40 according to the invention which in addition to what is shown in FIG. 1, as well as a reference plate 25 made from a coatable material, preferably also has a sensor 28. The reference plate 25 is not part of the component 4, 120, 130, 155 (FIG. 6, 7, 8) that is to be coated. The reference plate 25 can be examined in the coating installation 10 without it being necessary to open the coating apparatus 40, in particular by means of a sensor 28.

Preferably, the reference plate 25 can be optically examined, and preferably the reference plate 25 is made from glass.

The reference plate 25 is preferably made from an optically transparent material, in particular from a glass.

The reference plate 25 is preferably coated and examined prior to commencement of the coating of the component 4, 120, 130.

Equally preferably, the reference plate 25 can preferably in addition be coated and examined during or after complete coating of the component 4, 120, 130, 155, and retesting of the coating material source 10 is possible.

The reference plate 25 can preferably also be replaced within the apparatus 40 during the coating operation.

As in the prior art, the coating material source 10 is preferably moved into a position 13 (indicated by dashed lines) and coated, so as to produce a spray cone 19 on the reference plate 25.

Equally preferably, however, it is also possible to displace the reference plate 25, i.e. for example to move it between coating material source 10 and component 4 so as to be coated (FIG. 4).

Then, it 25 is preferably moved back and preferably examined in a different position.

The front surface 26 or rear surface 27 of the reference plate 25 can be examined by the sensor 28.

Then, the spray cone 19 on the reference plate 25 is examined within the installation 40. This can be done by the sensor 28, which preferably measures reflection. In a preferred exemplary embodiment, the reference plate 25 is illuminated by the sensor 28 and at the same time the reflection is recorded.

Equally preferably, the reference plate 25 can be irradiated by means of an illumination source 37, with the sensor 28 then measuring the transmission of the illumination source 37, so that the position of the spray cone 19 can be determined.

This information (see FIG. 5) can preferably be presented graphically and shown to an operator of the apparatus 40 outside the apparatus 40. The operator can manually evaluate the information.

An evaluation unit 31 may preferably be present, to process and preferably assess the results from the sensor 28.

The information obtained is preferably used to realign the coating material source 10.

This alignment step can be carried out at any time during the coating process or prior to initial coating.

Deviations in the spray cone 19 from the desired geometry 22 may be caused by;

misalignment of the nozzle of the coating material source 10 wear to the nozzle of the coating material source 10 misalignment of the component 4, 120, 130, 155.

The method for evaluating the coated reference plate 25 is explained with reference to FIG. 5.

FIG. 5 illustrates the reference plate 25 with a spray cone 19.

The illumination source 37 emits beams 34, which in the region of the spray cone 19 cannot reach the sensor 28 behind the reference plate 26 or can do so only to an attenuated extent. The percentage transmission 40 is measured, as illustrated on the right-hand side of FIG. 5.

FIG. 5 shows only a section through the three-dimensional geometry (x, y transmission) of the spray cone 19. However, the three-dimensional results are preferably used for the evaluation.

Misalignment of the material source 10 can be checked by means of auxiliary grid lines 29 on the reference plate 25.

The apparatus 40 and the process have the advantage that the results of the alignment can be automatically evaluated and can even be stored and archived in digitized form. It is also possible to correct the plasma parameters or the plasma nozzle by means of a knowledge database.

The coating process can be interrupted if a misalignment is present, or alternatively on-time process control is possible.

FIG. 6 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon, scandium (Sc) and/or at least one rare earth element or hafnium). Alloys of this type are known from EP0 486 489 B1, EP0 786 017 B1, EP0 412 397 B1 or EP 1 306 454 A1.

A thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 7 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component. Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 8 shows a combustion chamber 110 of a gas turbine. The combustion chamber 110 is configured, for example, as what is known as an annular combustion chamber, in which a multiplicity of burners 107, which generate flames 156, arranged circumferentially around the axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by means of suitable coating processes, such as for example electron beam physical vapor deposition (EB-PVD).

Other coating processes are possible, e.g. atmospheric plasma spraying (APS, LPPS, VPS) or CVD. The thermal barrier coating may include grains that are porous or contain micro-cracks or macro-cracks, in order to improve the resistance to thermal shocks.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

The invention claimed is:

1. A coating apparatus in which a component to be coated is fitted and subsequently coated, comprising:
   a reference plate that is optically examinable within the coating apparatus, the reference plate being optically transparent;

a coating material source that deposits a coating material on at least two substrates at different times, the at least two substrates including the component and the reference plate;

an illumination source that illuminates a coated side of the reference plate when the reference plate is used as the substrate;

a sensor that optically examines a geometry of a deposition of the coating material on the reference plate by measuring a transmission of the illumination through the reference plate, when the reference plate is used as the substrate, wherein the sensor and the illumination source are arranged on opposite sides of the reference plate when the reference plate is used as the substrate; and an evaluation unit that processes data from the sensor regarding the geometry of the deposition of the coating material on the reference plate, to evaluate an alignment of the component and/or the coating material source.

2. The apparatus as claimed in claim 1, wherein the reference plate is exchangeable during a coating operation.

3. The apparatus as claimed in claim 1, wherein the coating material source is displaceable toward the reference plate.

4. The apparatus as claimed in claim 1, wherein the reference plate is displaceable toward the coating material source.

5. The apparatus as claimed in claim 1, wherein the sensor examines a three-dimensional geometry of the deposition of the coating material on the reference plate.

* * * * *